United States Patent
Lloyd (10) Patent No.: US 9,076,445 B1
(45) Date of Patent: *Jul. 7, 2015

(54) ADJUSTING LANGUAGE MODELS USING CONTEXT INFORMATION

(71) Applicant: Google Inc., Mountain View, CA (US)

(72) Inventor: Matthew I. Lloyd, Cambridge, MA (US)

(73) Assignee: Google Inc., Mountain View, CA (US)

( * ) Notice: Subject to any disclaimer, the term of this patent is extended or adjusted under 35 U.S.C. 154(b) by 212 days.

This patent is subject to a terminal disclaimer.

(21) Appl. No.: 13/705,228

(22) Filed: Dec. 5, 2012

Related U.S. Application Data (63) Continuation of application No. 13/250,496, filed on Sep. 30, 2011, now Pat. No. 8,352,246, which is a continuation of application No. 13/077,106, filed on Mar. 31, 2011, now Pat. No. 8,352,245.

(60) Provisional application No. 61/428,533, filed on Dec. 30, 2010.

(51) Int. Cl.
*G10L 15/18* (2013.01)

(52) U.S. Cl.
CPC ...................... *G10L 15/18* (2013.01)

(58) Field of Classification Search
CPC .............. G10L 15/065; G10L 2015/228
USPC ............................................................ 704/9
See application file for complete search history.

(56) References Cited

U.S. PATENT DOCUMENTS

| | | | |
|---|---|---|---|
| 4,820,059 A | | 4/1989 | Miller et al. |
| 5,267,345 A | | 11/1993 | Brown et al. |
| 5,632,002 A | | 5/1997 | Hashimoto et al. |
| 5,638,487 A | * | 6/1997 | Chigier .......................... 704/253 |
| 5,715,367 A | * | 2/1998 | Gillick et al. .................. 704/254 |
| 5,737,724 A | | 4/1998 | Atal et al. |
| 5,768,603 A | | 6/1998 | Brown et al. |
| 5,805,832 A | | 9/1998 | Brown et al. |

(Continued)

FOREIGN PATENT DOCUMENTS

| | | |
|---|---|---|
| DE | 10045020 A1 | 5/2001 |
| WO | WO02096070 A2 | 11/2002 |

OTHER PUBLICATIONS

United States Office Supplemental Notice of Allowance in U.S. Appl. No. 13/077,106, dated Nov. 7, 2012, 3 pages.

(Continued)

*Primary Examiner* — Michael N Opsasnick
(74) *Attorney, Agent, or Firm* — Fish & Richardson P.C.

(57) ABSTRACT

Methods, systems, and apparatuses, including computer programs encoded on a computer storage medium, for adjusting language models. In one aspect, a method includes accessing audio data. Information that indicates a first context is accessed, the first context being associated with the audio data. At least one term is accessed. Information that indicates a second context is accessed, the second context being associated with the term. A similarity score is determined that indicates a degree of similarity between the second context and the first context. A language model is adjusted based on the accessed term and the determined similarity score to generate an adjusted language model. Speech recognition is performed on the audio data using the adjusted language model to select one or more candidate transcriptions for a portion of the audio data.

21 Claims, 5 Drawing Sheets

(56) References Cited

U.S. PATENT DOCUMENTS

| | | | |
|---|---|---|---|
| 5,822,730 A * | 10/1998 | Roth et al. | 704/255 |
| 6,021,403 A | 2/2000 | Horvitz et al. | |
| 6,119,186 A | 9/2000 | Watts et al. | |
| 6,167,377 A * | 12/2000 | Gillick et al. | 704/240 |
| 6,182,038 B1 | 1/2001 | Balakrishnan et al. | |
| 6,317,712 B1 * | 11/2001 | Kao et al. | 704/256.3 |
| 6,397,180 B1 | 5/2002 | Jaramillo et al. | |
| 6,418,431 B1 | 7/2002 | Mahajan et al. | |
| 6,446,041 B1 | 9/2002 | Reynar et al. | |
| 6,539,358 B1 | 3/2003 | Coon et al. | |
| 6,581,033 B1 | 6/2003 | Reynar et al. | |
| 6,678,415 B1 * | 1/2004 | Popat et al. | 382/226 |
| 6,714,778 B2 | 3/2004 | Nykänen et al. | |
| 6,778,959 B1 | 8/2004 | Wu et al. | |
| 6,839,670 B1 | 1/2005 | Stammler et al. | |
| 6,876,966 B1 | 4/2005 | Deng et al. | |
| 6,912,499 B1 * | 6/2005 | Sabourin et al. | 704/243 |
| 6,922,669 B2 | 7/2005 | Schalk et al. | |
| 6,950,796 B2 | 9/2005 | Ma et al. | |
| 6,959,276 B2 | 10/2005 | Droppo et al. | |
| 7,027,987 B1 | 4/2006 | Franz et al. | |
| 7,043,422 B2 | 5/2006 | Gao et al. | |
| 7,149,688 B2 * | 12/2006 | Schalkwyk | 704/255 |
| 7,149,970 B1 | 12/2006 | Pratley et al. | |
| 7,174,288 B2 | 2/2007 | Ju et al. | |
| 7,200,550 B2 | 4/2007 | Menezes et al. | |
| 7,257,532 B2 | 8/2007 | Toyama | |
| 7,310,601 B2 | 12/2007 | Nishizaki et al. | |
| 7,366,668 B1 | 4/2008 | Franz et al. | |
| 7,370,275 B2 | 5/2008 | Haluptzok et al. | |
| 7,383,553 B2 | 6/2008 | Atkin et al. | |
| 7,392,188 B2 | 6/2008 | Junkawitsch et al. | |
| 7,403,888 B1 | 7/2008 | Wang et al. | |
| 7,424,426 B2 | 9/2008 | Furui et al. | |
| 7,424,428 B2 | 9/2008 | Rose et al. | |
| 7,451,085 B2 | 11/2008 | Rose et al. | |
| 7,505,894 B2 | 3/2009 | Menezes et al. | |
| 7,526,431 B2 | 4/2009 | Roth et al. | |
| 7,577,562 B2 | 8/2009 | Menezes et al. | |
| 7,634,720 B2 | 12/2009 | Haluptzok et al. | |
| 7,672,833 B2 | 3/2010 | Blume et al. | |
| 7,698,124 B2 | 4/2010 | Menezes et al. | |
| 7,698,136 B1 | 4/2010 | Nguyen et al. | |
| 7,752,046 B2 | 7/2010 | Bacchiani et al. | |
| 7,778,816 B2 | 8/2010 | Reynar | |
| 7,805,299 B2 * | 9/2010 | Coifman | 704/235 |
| 7,831,427 B2 | 11/2010 | Potter et al. | |
| 7,848,927 B2 | 12/2010 | Ohno et al. | |
| 7,881,936 B2 | 2/2011 | Longé et al. | |
| 7,890,326 B2 | 2/2011 | Strope et al. | |
| 7,907,705 B1 | 3/2011 | Huff et al. | |
| 7,941,189 B2 | 5/2011 | Miyauchi | |
| 7,953,692 B2 | 5/2011 | Bower et al. | |
| 7,996,220 B2 | 8/2011 | Rose et al. | |
| 8,001,130 B2 | 8/2011 | Wen et al. | |
| 8,005,680 B2 | 8/2011 | Kommer | |
| 8,009,678 B2 | 8/2011 | Brooke | |
| 8,027,973 B2 | 9/2011 | Cao et al. | |
| 8,060,373 B2 | 11/2011 | Gibbon et al. | |
| 8,069,027 B2 | 11/2011 | Liu et al. | |
| 8,069,043 B2 | 11/2011 | Bacchiani et al. | |
| 8,700,392 B1 | 4/2014 | Hart et al. | |
| 2002/0062216 A1 | 5/2002 | Guenther et al. | |
| 2002/0087309 A1 | 7/2002 | Lee et al. | |
| 2002/0087314 A1 | 7/2002 | Fischer et al. | |
| 2002/0111990 A1 | 8/2002 | Wood et al. | |
| 2003/0050778 A1 | 3/2003 | Nguyen et al. | |
| 2003/0149561 A1 | 8/2003 | Zhou | |
| 2003/0216919 A1 | 11/2003 | Roushar | |
| 2003/0236099 A1 | 12/2003 | Deisher et al. | |
| 2004/0024583 A1 | 2/2004 | Freeman | |
| 2004/0034518 A1 * | 2/2004 | Rose et al. | 704/1 |
| 2004/0043758 A1 | 3/2004 | Sorvari et al. | |
| 2004/0049388 A1 | 3/2004 | Roth et al. | |
| 2004/0098571 A1 | 5/2004 | Falcon | |
| 2004/0138882 A1 | 7/2004 | Miyazawa | |
| 2004/0172258 A1 | 9/2004 | Dominach et al. | |
| 2004/0230420 A1 | 11/2004 | Kadambe et al. | |
| 2004/0243415 A1 | 12/2004 | Commarford et al. | |
| 2005/0005240 A1 | 1/2005 | Reynar et al. | |
| 2005/0108017 A1 | 5/2005 | Esser et al. | |
| 2005/0114474 A1 | 5/2005 | Anderson et al. | |
| 2005/0187763 A1 | 8/2005 | Arun | |
| 2005/0193144 A1 | 9/2005 | Hassan et al. | |
| 2005/0216273 A1 | 9/2005 | Reding et al. | |
| 2005/0234723 A1 * | 10/2005 | Arnold et al. | 704/257 |
| 2005/0246325 A1 | 11/2005 | Pettinati et al. | |
| 2005/0283364 A1 | 12/2005 | Longe et al. | |
| 2006/0004572 A1 | 1/2006 | Ju et al. | |
| 2006/0004850 A1 | 1/2006 | Chowdhury | |
| 2006/0009974 A1 | 1/2006 | Junqua et al. | |
| 2006/0035632 A1 | 2/2006 | Sorvari et al. | |
| 2006/0095248 A1 | 5/2006 | Menezes et al. | |
| 2006/0111891 A1 | 5/2006 | Menezes et al. | |
| 2006/0111892 A1 | 5/2006 | Menezes et al. | |
| 2006/0111896 A1 | 5/2006 | Menezes et al. | |
| 2006/0212288 A1 | 9/2006 | Sethy et al. | |
| 2006/0247915 A1 | 11/2006 | Bradford et al. | |
| 2007/0060114 A1 | 3/2007 | Ramer et al. | |
| 2007/0174040 A1 | 7/2007 | Liu et al. | |
| 2008/0027723 A1 | 1/2008 | Reding et al. | |
| 2008/0091406 A1 | 4/2008 | Baldwin et al. | |
| 2008/0091435 A1 | 4/2008 | Strope et al. | |
| 2008/0091443 A1 | 4/2008 | Strope et al. | |
| 2008/0131851 A1 | 6/2008 | Kanevsky et al. | |
| 2008/0133228 A1 | 6/2008 | Rao | |
| 2008/0188271 A1 | 8/2008 | Miyauchi | |
| 2008/0221887 A1 | 9/2008 | Rose et al. | |
| 2008/0221902 A1 | 9/2008 | Cerra et al. | |
| 2008/0300871 A1 * | 12/2008 | Gilbert | 704/233 |
| 2008/0301112 A1 | 12/2008 | Wu | |
| 2009/0030687 A1 | 1/2009 | Cerra et al. | |
| 2009/0030696 A1 | 1/2009 | Cerra et al. | |
| 2009/0150160 A1 | 6/2009 | Mozer | |
| 2009/0164216 A1 | 6/2009 | Chengalvarayan et al. | |
| 2009/0210214 A1 | 8/2009 | Qian et al. | |
| 2009/0271177 A1 | 10/2009 | Menezes et al. | |
| 2009/0271188 A1 | 10/2009 | Agapi et al. | |
| 2009/0287681 A1 | 11/2009 | Paek et al. | |
| 2009/0292529 A1 | 11/2009 | Bangalore et al. | |
| 2010/0004930 A1 | 1/2010 | Strope et al. | |
| 2010/0049502 A1 | 2/2010 | Oppenheim et al. | |
| 2010/0088303 A1 | 4/2010 | Chen et al. | |
| 2010/0100377 A1 | 4/2010 | Madhavapeddi et al. | |
| 2010/0153219 A1 | 6/2010 | Mei et al. | |
| 2010/0179803 A1 | 7/2010 | Sawaf et al. | |
| 2010/0254521 A1 | 10/2010 | Kriese et al. | |
| 2010/0318531 A1 | 12/2010 | Gao et al. | |
| 2010/0325109 A1 | 12/2010 | Bai et al. | |
| 2011/0004462 A1 | 1/2011 | Houghton et al. | |
| 2011/0066577 A1 | 3/2011 | Van et al. | |
| 2011/0077943 A1 | 3/2011 | Miki et al. | |
| 2011/0093265 A1 | 4/2011 | Stent et al. | |
| 2011/0137653 A1 | 6/2011 | Ljolje et al. | |
| 2011/0162035 A1 | 6/2011 | King et al. | |
| 2011/0231183 A1 | 9/2011 | Yamamoto et al. | |
| 2011/0257674 A1 | 10/2011 | Kristjansson et al. | |
| 2011/0288868 A1 | 11/2011 | Lloyd et al. | |
| 2011/0295590 A1 * | 12/2011 | Lloyd et al. | 704/8 |
| 2012/0022869 A1 * | 1/2012 | Lloyd et al. | 704/244 |
| 2013/0297313 A1 * | 11/2013 | Lloyd et al. | 704/255 |
| 2013/0346077 A1 * | 12/2013 | Mengibar et al. | 704/235 |
| 2014/0039894 A1 * | 2/2014 | Shostak | 704/251 |

OTHER PUBLICATIONS

United States Notice of Allowance in U.S. Appl. No. 13/250,466, dated Nov. 9, 2012, 23 pages.

Authorized Officer H. Van Doremalen. International Search Report and Written Opinion in International Application No. PCT/US2012/021221, dated Apr. 5, 2012, 11 pages.

United States Office Action in U.S. Appl. No. 13/249,172, mailed Dec. 29, 2011, 17 pages.

(56) References Cited

OTHER PUBLICATIONS

United States Office Action in U.S. Appl. No. 13/249,181, mailed Dec. 23, 2011, 23 pages.
United States Office Action in U.S. Appl. No. 12/976,920, mailed Jan. 20, 2012, 17 pages.
United States Office Action in U.S. Appl. No. 13/249,175, mailed Jan. 10, 2012, 17 pages.
United States Office Action in U.S. Appl. No. 13/249,180, mailed Dec. 27, 2011, 12 pages.
Extended European Search Report, Application No. EP 10 165 480.4, dated Oct. 24, 2011, 68 pages.
United States Office Action in U.S. Appl. No. 12/760,147, dated Nov. 23, 2011, 13 pages.
United States Office Action in U.S. Appl. No. 12/782/862, dated Nov. 30, 2011, 24 pages.
United States Office Action in U.S. Appl. No. 12/787,568, dated Nov. 22, 2011, 16 pages.
United States Office Action in U.S. Appl. No. 13/040,553, dated Jan. 10, 2012, 23 pages.
United States Notice of Allowance in U.S. Appl. No. 13/040,553, dated May 23, 2012, 14 pages.
United States Office Action in U.S. Appl. No. 13/250,496, dated Dec. 13, 2011, 25 pages.
United States Office Action in U.S. Appl. No. 13/250,496, dated May 29, 2012, 18 pages.
United States Office Action in U.S. Appl. No. 13/250,466, dated Jun. 5, 2012, 23 pages.
United States Office Action in U.S. Appl. No. 13/077,106, dated Jun. 6, 2012, 20 pages.
United States Notice of Allowance in U.S. Appl. No. 13/040,553, dated Aug. 23, 2012, 13 pages.
United States Office Notice of Allowance in U.S. Appl. No. 13/077,106, dated Sep. 21, 2012, 9 pages.
United States Notice of Allowance in U.S. Appl. No. 13/250,496, dated Sep. 26, 2012, 10 pages.
Authorized Officer B. R. Copenheaver. International Search Report and Written Opinion in International Application No. PCT/US2011/046629, dated Dec. 9, 2011, 14 pages.
Authorized Officer R. Poquet. International Search Report and Written Opinion in International Application No. PCT/US2011/037558, dated Jul. 29, 2011, 11 pages.
Authorized Officer R. Poquet. International Search Report and Written Opinion in International Application No. PCT/US2011/029407, dated Jun. 7, 2011, 10 pages.
Authorized Officer I. Barabasz. International Search Report and Written Opinion in International Application No. PCT/US2011/036984, dated Aug. 31, 2011, 13 pages.
Bocchieri et al., "Use of geographical meta-data in ASR language and acoustic models", Acoustics Speech and Signal Processing (ICASSP), 2010 IEEE International Conference on IEEE, Mar. 14, 2010, pp. 5118-5121.
Frey, B., et al., "ALGONQUIN: Iterating Laplace's Method to Remove Multiple Types of Acoustic Distortion for Robust Speech Recognition", EUROSPEECH 2001 Scandinavia, 7th European Conference on Speech Communication and Technology, Aalborg, Denmark, Sep. 3-7, 2001, [online]. research.microsoft.com [retrieved on Nov. 23, 2010]. Retrieved from the Internet: <URL: http://research.microsoft.com/pubs/76516/2001-frey-eurospeech.pdf>. 4 pages.
Hongyuan Zha et al. Bipartite graph partitioning and data clustering. In Proceedings of the tenth international conference on Information and knowledge management (CIKM '01), Henrique Paques, Ling Liu, and David Grossman (Eds.). 2001, ACM, New York, NY, USA, 25-32.
Inderjit S. Dhillon. 2001. Co-clustering documents and words using bipartite spectral graph partitioning. In: Proceedings of the seventh ACM SIGKDD international conference on Knowledge discovery and data mining, (KDD '01). ACM, New York, NY, USA, 269-274. http://doi.acm.org/10.1145/502512.502550
Kristjansson, T., et al., "Super-Human Multi-Talker Speech Recognition: The IBM 2006 Speech Separation Challenge System", INTERSPEECH 2006: ICSLP; Proceedings of the Ninth International Conference on Spoken Language Process, Sep. 17-21, 2006, Pittsburgh, Pennsylvania, USA, Bonn, ISCA, 2006, 4 pages.
Shengliang Xu et al. 2007. Using social annotations to improve language model for information retrieval. In: Proceedings of the sixteenth ACM conference on Conference on information and knowledge management, (CIKM '07). ACM, New York, NY, USA, 1003-1006. http://doi.acm.org/10.1145.
Mohri et al. Weighted Finite-State Transducers in Speech Recognition, Computer Speech & Language, vol. 16, Issue 1, Jan. 2002, pp. 69-88.
Vertanen, Keith. "An Overview of Discriminative Training for Speech Recognition." Technical Report, 2004, from http://www.inference.phy.cam.ac.uk/kv227/papers/Discriminative_Training.pdf., 14 pages.
Xiaoyong Liu and W. Bruce Croft. 2004. Cluster-based retrieval using language models. In: Proceedings of the 27th annual international ACM SIGIR conference on Research and development in information retrieval, (SIGIR '04). ACM, New York, NY, USA, 186-193. http://doi.acm.org/10.1145/1008992.1009026
Yeha Lee et al. Search Result Clustering Using Label Language Model. IJCNLP 2008, The Third International Joint Conference on Natural Language Processing. Jan. 7-12, 2008, Hyderabad, India.
Zweig, G., "New Methods for the Analysis of Repeated Utterances", INTERSPEECH 2009, 10th Annual Conference of the International Speech Communication Association, Brighton, United Kingdom, Sep. 6-10, 2009, 4 pages.
Zweig, G., et al., "Structured Models for Joint Decoding of Repeated Utterances", INTERSPEECH 2008, 9th Annual Conference of the International Speech Communication Association, Brisbane, Australia, Sep. 22-26, 2008, 4 pages.

\* cited by examiner

ADJUSTING LANGUAGE MODELS USING CONTEXT INFORMATION

CROSS-REFERENCE TO RELATED APPLICATIONS

This application is a continuation of and claims priority from U.S. patent application Ser. No. 13/250,496, now U.S. Pat. No. 8,352,246, filed on Sep. 30 2011, which is a continuation of U.S. patent application Ser. No. 13/077,106, now U.S. Pat. No. 8,352,245, filed on Mar. 31, 2011. The contents of both applications are incorporated herein by reference in their entirety. Prior application Ser. No. 13/077,106 claims priority to U.S. Provisional Application No. 61/428,533, filed on Dec. 30, 2010. The entire contents of U.S. Provisional Application No. 61/428,533 are also incorporated herein by reference their entirety.

BACKGROUND

The use of speech recognition is becoming more and more common. As technology has advanced, users of computing devices have gained increased access to speech recognition functionality. Many users rely on speech recognition in their professions and in other aspects of daily life.

SUMMARY

In one aspect, a method includes accessing audio data; accessing information that indicates a first context, the first context being associated with the audio data; accessing at least one term; accessing information that indicates a second context, the second context being associated with the term; determining a similarity score that indicates a degree of similarity between the second context and the first context; adjusting a language model based on the accessed term and the determined similarity score to generate an adjusted language model, where the adjusted language model includes the accessed term and a weighting value assigned to the accessed term based on the similarity score; and performing speech recognition on the audio data using the adjusted language model to select one or more candidate transcriptions for a portion of the audio data.

Implementations can include one or more of the following features. For example, the adjusted language model indicates a probability of an occurrence of a term in a sequence of terms based on other terms in the sequence. Adjusting a language model includes accessing a stored language model and adjusting the stored language model based on the similarity score. Adjusting the accessed language model includes adjusting the accessed language model to increase a probability in the language model that the accessed term will be selected as a candidate transcription for the audio data. Adjusting the accessed language model to increase a probability in the language model includes changing an initial weighting value assigned to the term based on the similarity score. The method includes determining that the accessed term was entered by a user, the audio data encodes speech of the user, the first context includes the environment in which the speech occurred, and the second context includes the environment in which the accessed term was entered. The information that indicates the first context and the information that indicates the second context each indicate a geographic location. The information that indicates a first context and information that indicates the second context each indicate a document type or application type. The information indicating the first context and the information indicating the second context each include an identifier of a recipient of a message. The method includes identifying at least one second term related to the accessed term, the language model includes the second term, and adjusting the language model includes assigning a weighting value to the second term based on the similarity score. The accessed term was recognized from a speech sequence and the audio data is a continuation of the speech sequence.

Other implementations of these aspects include corresponding systems, apparatus, and computer programs, configured to perform the actions of the methods, encoded on computer storage devices.

The details of one or more implementations are set forth in the accompanying drawings and the description below. Other features and advantages will become apparent from the description, the drawings, and the claims.

DETAILED DESCRIPTION

Speech recognition can be performed by adjusting a language model using context information. A language model indicates probabilities that words will occur in a speech sequence based on other words in the sequence. In various implementations, the language model can be adjusted so that when recognizing speech, words that have occurred in a context similar to the current context have increased probabilities (relative to their probabilities in the unadjusted language model) of being selected as transcriptions for the speech. For example, a speech recognition system can identify a location where a speaker is currently speaking A language model of the speech recognition system can be adjusted so that words that were previously typed or spoken near that location can be increased (relative to their values in the unadjusted model), which may result in those words having higher probabilities than words that were not previously typed or spoken nearby. A given context may be defined by one or more various factors related to the audio data corresponding to the speech or related to previously entered words including, for example an active application, a geographic location, a time of day, a type of document, a message recipient, a topic or subject, and other factors.

The language model can also be customized to a particular user or a particular set of users. A speech recognition system can access text associated with a user (for example, e-mail messages, text messages, and documents written or received by the user) and context information that describes various contexts related to the accessed text. Using the accessed text and the associated context, a language model can be customized to increase the probabilities of words that the user has previously used. For example, when the word "football" occurs in e-mail messages written by a user, and that user is currently dictating an e-mail message, the speech recognition system increases the likelihood that the word "football" will be transcribed during the current dictation. In addition, based on the occurrence of the word "football" in a similar context to the current dictation, the speech recognition system can identify a likely topic or category (e.g., "sports"). The speech recognition system can increase the probabilities of words related that topic or category (e.g., "ball," "team," and "game"), even if the related words have not occurred in previous e-mail messages from the user.

Figure 1:
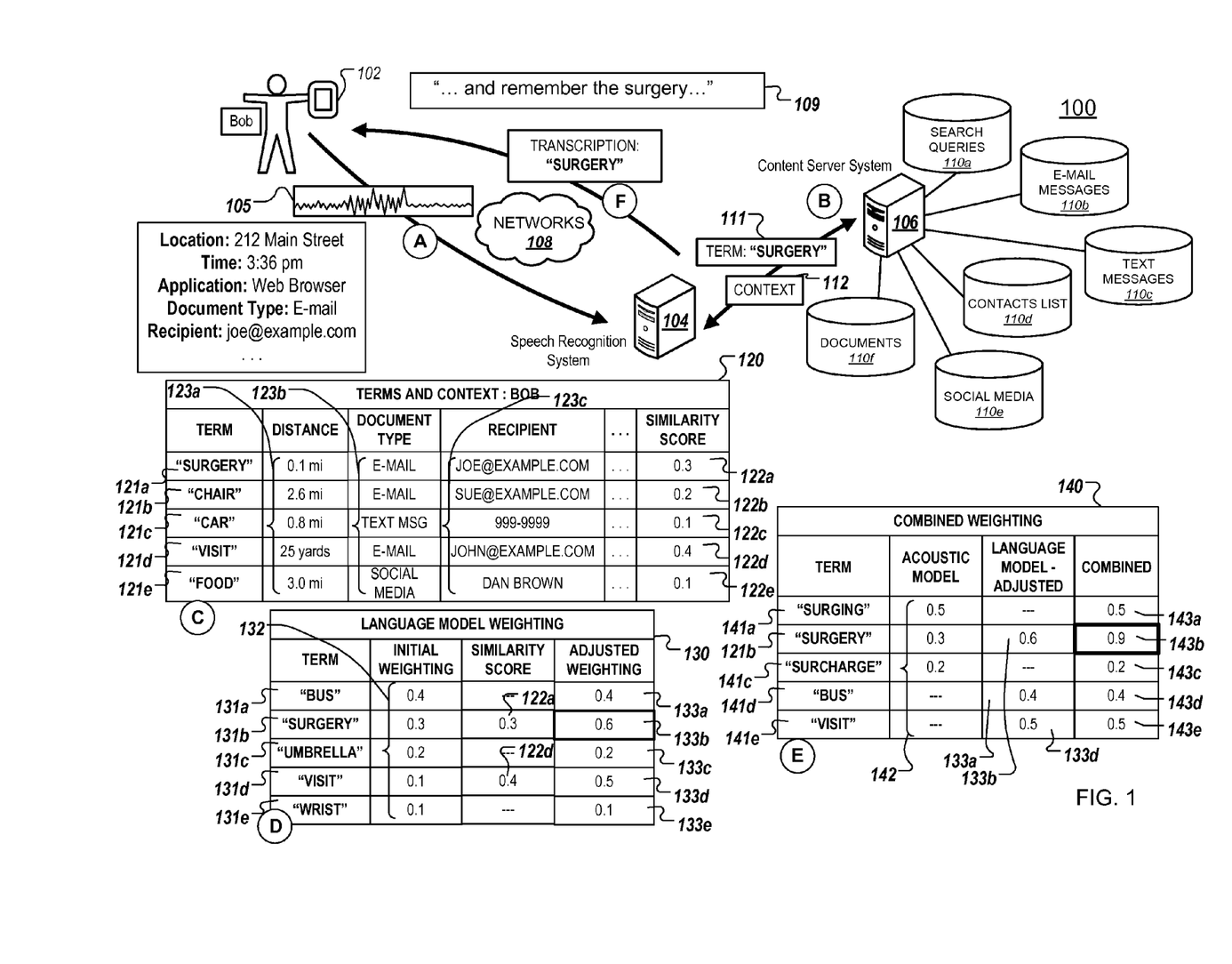
FIGS. 1 and 3 are diagrams illustrating examples of systems in which a language model is adjusted.

FIG. 1 is a diagram illustrating an example of a system 100 in which a language model is adjusted. The system 100 includes a mobile client communication device ("client device") 102, a speech recognition system 104 (e.g., an Automated Speech Recognition ("ASR") engine), and a content server system 106. The client device 102, the speech recognition system 104, and the content server system communicate with each other over one or more networks 108. FIG. 1 also illustrates a flow of data during states (A) to (F).

During state (A), a user 101 of the client device 102 speaks one or more terms into a microphone of the client device 102. Utterances that correspond to the spoken terms are encoded as audio data 105. The client device 102 also identifies context information 107 related to the audio data 105. The context information 107 indicates a particular context, as described further below. The audio data 105 and the context information 107 are communicated over the networks 108 to the speech recognition system 104.

In the illustrated example, the user 101 speaks a speech sequence 109 including the words "and remember the surgery." A portion of the speech sequence 109 including the words "and remember the" has already been recognized by the speech recognition system 104. The audio data 105 represents the encoded sounds corresponding to the word "surgery," which the speech recognition system 104 has not yet recognized.

The context information 107 associated with the audio data 105 indicates a particular context. The context can be the environment, conditions, and circumstances in which the speech encoded in the audio data 105 (e.g., "surgery") was spoken. For example, the context can include when the speech occurred, where the speech occurred, how the speech was entered or received on the device 102, and combinations thereof. The context can include factors related to the physical environment (such as location, time, temperature, weather, or ambient noise). The context can also include information about the state of the device 102 (e.g., the physical state and operating state) when the speech encoded in the audio data 105 is received.

The context information 107 can include, for example, information about the environment, conditions, and circumstances in which the speech sequence 109 occurred, such as when and where the speech was received by the device 102. For example, the context information 107 can indicate a time and location that the speech sequence 109 was spoken. The location can be indicated in one or more of several forms, such as a country identifier, street address, latitude/longitude coordinates, and GPS coordinates. The context information 107 can also describe an application (e.g., a web browser or e-mail client) that is active on the device 102 when the speech sequence 109 was spoken, a type of document being dictated (e.g., an e-mail message or text message), an identifier for one or more particular recipients (e.g., joe@example.com or Dan Brown) of a message being composed, and/or a domain (e.g., example.com) for one or more message recipients. Other examples of context information 107 include the whether the device 102 is moving or stationary, the speed of movement of the device 102, whether the device 102 is being held or not, a pose or orientation of the device 102, whether or not the device 102 is connected to a docking station, the type of docking station to which the client device 102 is connected, whether the device 102 is in the presence of wireless networks, what types of wireless networks are available (e.g., cellular networks, 802.11, 3G, and Bluetooth), and/or the types of networks to which the device 102 is currently connected. In some implementations, the context information 107 can include terms in a document being dictated, such as the subject of an e-mail message and previous terms in the e-mail message. The context information 107 can also include categories of terms that occur in a document being dictated, such as sports, business, or travel.

During state (B), the speech recognition system 104 accesses (i) at least one term 111 and (ii) context information 112 associated to the term 111. The accessed term 111 can be one that occurs in text related to the user 101, for example, text that was previously written, dictated, received, or viewed by the user 101. The speech recognition system 104 can determine that a particular term 111 is related to the user before accessing the term 111. The context information 112 can indicate, for example, a context in which the term 111 occurs and/or the context in which the accessed term 111 was entered. A term can be entered, for example, when it is input onto the device 102 or input into a particular application or document. A term can be entered by a user in a variety of ways, for example, through speech, typing, or selection on a user interface.

The speech recognition system 104 can access a term 111 and corresponding context information 112 from a content server system 106. The content server system 106 can store or access a variety of information in various data storage devices 110a-110f The data storage devices 110a-110f can include, for example, search queries, e-mail messages, text messages (for example, Short Message Service ("SMS") messages), contacts list text, text from social media sites and applications, documents (including shared documents), and other sources of text. The content server system 106 also stores context information 112 associated with the text, for example, an application associated with the text, a geographic location, a document type, and other context information associated with text. Context information 112 can be stored for documents as a whole, for groups of terms, or individual terms. The context information 112 can indicate any and all of the types of information described above with respect to the context information 107.

As an example, the term 111 includes the word "surgery." The context information 112 associated with the term 111 can indicate, for example, that the term 111 occurred in an e-mail message sent by the user 101 to a particular recipient "joe@example.com." The context information 112 can further indicate, for example, an application used to enter the text of the e-mail message including the term 111, whether the term 111 was dictated or typed, the geographic location the e-mail message was written, the date and time the term 111 was entered, the date and time the e-mail message including the term 111 was sent, other recipients of the email message including the term 111, a domain of a recipient (e.g., "example.com") of the email message containing the term 111, the type of computing device used to enter the term 111, and so on.

The accessed term 111 can be a term previously recognized from a current speech sequence 109, or a term in a document that is currently being dictated. In such an instance, the context for the audio data 105 can be very similar to the context of the accessed term 111.

The speech recognition system 104 can identify the user 101 or the client device 102 to access a term 111 related to the user 101. For example, the user 101 can be logged in to an account that identifies the user 101. An identifier of the user 101 or the client device 102 can be transmitted with the context information 107. The speech recognition system 104 can use the identity to access a term 111 that occurs in text related to the user 101, for example, a term 111 that occurs in an e-mail message composed by the user 101 or a term 111 that occurs in a search query of the user 101.

During state (C), the speech recognition system 104 determines a similarity score that indicates the degree of similarity between the context described in the context information 112 and the context described in the context information 107. In other words, the similarity score indicates a degree of similarity between the context of the accessed term 111 and the context associated with the audio data 105. In the example shown in table 120, several accessed terms 121a-121e are illustrated with corresponding similarity scores 122a-122e. The similarity scores 122a-122e are based on the similarity between the context information for the terms 121a-121e (illustrated in columns 123a-123c) and the context information 107 for the audio data 105.

Each similarity score 122a-122e can be a value in a range, such as a value that indicates the degree that the context corresponding to each term 121a-121e (indicated in the context information 123a-123c) matches the context corresponding to the audio data 105 (indicated in the context information 107). Terms 121a-121e that occur in a context very much like the context described in the context information 107 can have higher similarity scores 122a-122 than terms 121a-121e that occur in less similar contexts. The similarity scores 122a-122e can also be binary values indicating, for example, whether the context of the term is in substantially the same context as the audio data. For example, the speech recognition system 104 can determine whether the context associated with a term 121a-121e reaches a threshold level of similarity to the context described in the context information 107.

The similarity score can be based on one or more different aspects of context information 112 accessed during state (B). For example, the similarity scores 122a-122e can be based on a geographical distance 123a between the geographic location that each term 121a-121e was written or dictated and the geographic location in the context information 107. The context information 123a-123c can also include a document type 123b (e.g., e-mail message, text message, social media, etc.) and a recipient 123c of a message if the term 121a-121e occurred in a message. Additionally, the similarity scores 122a-122e can also be based on a date, time, or day of the week that indicates, for example when each term 121a-121e was written or dictated, or when a file or message containing the term 121a-121e was created, sent, or received. Additional types of context can also described, for example, an application or application type with which the term 121a-121e was entered, a speed the mobile device was travelling when the term was entered, whether the mobile device was held when the term was entered, and whether the term was entered at a known location such as at home or at a workplace.

The similarity scores can be calculated in various ways. As an example, a similarity score can be based on the inverse of the distance 123a between a location associated with a term 121a-121e and a location associated with the audio data 105. The closer the location of the term 121a-121e is to the location of the audio data 105, the higher the similarity score 122a-122e can be. As another example, the similarity score 122a-122e can be based on the similarity of the document type indicated in the context information 107. When the user 101 is known to be dictating an e-mail message, the terms 121a-121e that occur in e-mail messages can be assigned a high similarity score (e.g., "0.75"), the terms 121a-121e that occur in a text message can be assigned a lower similarity score (e.g., "0.5"), and terms that occur in other types of documents can be assigned an even lower similarity score ("0.25").

Similarity scores 122a-122e can be determined based on a single aspect of context (e.g., distance 123a alone) or based on multiple aspects of context (e.g., a combination of distance 123a, document type 123b, recipient 123c, and other information). For example, when the context information 107 indicates that the audio data 105 is part of an e-mail message, a similarity score 122a-122e of "0.5" can be assigned to terms that have occurred in e-mail messages previously received or sent by the user 101. Terms that occur not merely in e-mail messages but particular to e-mail messages sent to the recipient indicated in the context information 107 can be assigned a similarity score 122a-122e of "0.6." Terms that occur in an e-mail message sent to that recipient at the same time of day can be assigned a similarity score 122a-122e of "0.8."

As another example, similarity scores 122a-122e can be determined by determining a distance between two vectors. A first vector can be generated based on aspects of the context of the audio data 105, and a second vector can be generated based on aspects of the context corresponding to a particular term 121a-121e. Each vector can include binary values that represent, for various aspects of context, whether a particular feature is present in the context. For example, various values of the vector can be assigned either a "1" or "0" value that corresponds to whether the device 102 was docked, whether the associated document is an e-mail message, whether the day indicated in the context is a weekend, and so on. The distance between the vectors, or another value based on the distance, can be assigned as a similarity score. For example, the inverse of the distance or the inverse of the square of the distance can be used, so that higher similarity scores indicate higher similarity between the contexts.

Additionally, or alternately, a vector distance can be determined that indicates the presence or absence of particular words in the context associated with the audio data 105 or a term 121a-121e. Values in the vectors can correspond to particular words. When a particular word occurs in a context (for example, occurs in a document that speech encoded in the audio data 105 is being dictated into, or occurs in a document previously dictated by the user 101 in which the term 121a-121e also occurs), a value of "1" can be assigned to the portion of the vector that corresponds to that word. A value of "0" can be assigned when the word is absent. The distance between the vectors can be determined and used as described above.

Similarity scores 122a-122e can be determined from multiple aspects of context. Measures of similarity for individual aspects of context can be combined additively using different weights, combined multiplicatively, or combined using any other function (e.g., minimum or maximum). Thresholds can be used for particular context factors, such as differences in time between the two contexts and differences in distance. For example, the similarity score 122a-122e (or a component of the similarity score 122a-122e) can be assigned a value of "1.0" if distance is less than 1 mile, "0.5" if less than 10 miles, and "0" otherwise. Similarly, a value of "1.0" can be assigned if the two contexts indicate the same time of day and same day of week, "0.5" if the contexts indicate the same day of week (or both indicate weekday or weekend), and "0" if neither time nor day of the week are the same.

The speech language recognition system 104 can also infer context information that affects the value of various similarity scores. For example, the current word count of a document can affect the similarity score. If the speech recognition system 104 determines that the user 101 has dictated five hundred words in a document, the speech recognition system 104 can determine that the user 101 is not dictating a text message. As a result, the speech recognition system 104 can decrease the similarity score 122a-122e assigned to terms 121a-121e that occur in text messages relative to the similarity scores 122a-122e assigned to terms 121a-121e that occur in e-mail messages and other types of documents. As another example, the speech language recognition system 104 can adjust similarity scores 122a-122e During state (D), the speech recognition system adjusts a language model using the accessed term 121a and the corresponding similarity score 122a. A language model can be altered based on the terms 121a-121e and corresponding similarity scores 122a-122e.

A table 130 illustrates a simple example of an adjustment to a small portion of language model. A language model is described in greater detail in FIGS. 2A and 2B. The table 130 illustrates a component of a language model corresponding to a decision to select a single term as a transcription. For example, the table 130 illustrates information used to select a single term in the speech sequence 109, a term that can be a transcription for the audio data 105.

The table 130 includes various terms 131a-131e that are included in the language model. In particular, the terms 131a-131e represent the set of terms that can validly occur at a particular point in a speech sequence. Based on other words in the sequence 109 (for example, previously recognized words), a particular portion of the audio data 105 is predicted to match one of the terms 131a-131e.

In some implementations, the accessed terms and similarity scores do not add terms to the language model, but rather adjust weighting values for terms that are already included in the language model. This can ensure that words are not added to a language model in a way that contradicts proper language conventions. This can avoid, for example, a noun being inserted into a language model where only a verb is valid. The terms 121b, 121c, and 121e are not included in the table 130 because the standard language model did not include them as valid possibilities. On the other hand, the term 121a ("surgery") and the term 121d ("visit") are included in the table 130 (as the term 131b and the term 131d, respectively) because they were included as valid terms in the standard language model.

Each of the terms 131a-131e is assigned an initial weighting value 132a-132e. The initial weighting values 132a-132e indicate the probabilities that the terms 131a-131e will occur in the sequence 109 without taking into account the similarity scores 122a-122e. Based on the other words in the speech sequence 109 (for example, the preceding words "and remember the"), the initial weighting values 132a-132e indicate the probability that each of the terms 131a-131e will occur next, at the particular point in the speech sequence 109 corresponding to the audio data 105.

Using the similarity scores 122a-122e, the speech recognition system 104 determines adjusted weighting values 133a-133e. For example, the speech recognition system 104 can combine the initial weighting values with the similarity scores to determine the adjusted weighting values 133. The adjusted weighting values 133a-133e incorporate (through the similarity scores 122a-122e) information about the contexts in which the terms 131a-131e occur, and the similarity between the contexts of those terms 131a-131e and the context of the audio data 105.

Terms that have occurred in one context often have a high probability of occurring again in a similar context. Accordingly, terms that occur in a similar context as to the context of the audio data 105 have a particularly high likelihood of occurring in the audio data 105. The initial weighting values 132 are altered to reflect the additional information included in the similarity scores 122a-122e. As a result, the initial weighting values 132 can be altered so that the adjusted weighting values 133a-133e are higher than the initial weighting values 132 for terms with high similarity scores 122a-122e.

For clarity, the adjusted weighting values 133a-133e are shown as the addition of the initial weighting values 132 and corresponding similarity scores 122a-122e. But, in other implementations, the adjusted weighting values 133a-133e can be determined using other processes. For example, either the initial weighting values 132 or the similarity scores 122a-122e can be weighted more highly in a combination. As another example, the similarity scores 122a-122e can be scaled according to the frequency that the corresponding term 131a-131e occurs in a particular context, and the scaled similarity score 122a-122e can be used to adjust the initial weighting values. The similarity scores can be normalized or otherwise adjusted before determining the adjusting weighting values 133a-133e.

The adjusted weighting scores 133a-133e can represent probabilities associated with the terms 131a-131e in the language model. In other words, the terms 131a-131e corresponding to the highest weighting values 133a-133e are the most likely to be correct transcriptions. The term 131b ("surgery") is assigned the highest adjusted weighting value 133b, with a value of "0.6," indicating that the language model indicates that the term "surgery" has a higher probability of occurring than the other terms 131a, 131c-131e.

During state (E), the speech recognition system uses the determined language model to select a recognized word for the audio data 105. The speech recognition system 104 uses information from the adjusted language model and from an acoustic model to determine combined weighting values. The speech recognition system uses the combined weighting values to select a transcription for the audio data 105.

The acoustic model can indicate terms that match the sounds in the audio data 105, for example, terms that sound similar to one or more portions of the audio data 105. The acoustic model can also output a confidence value or weighting value that indicates the degree that the terms match the audio data 105.

A table 140 illustrates an example of the output of the acoustic model and the language model and the combination of the outputs. The table includes terms 141a-141e, which include outputs from both the language model and the acoustic model. The table 140 also includes weighting values 142 from the acoustic model and the adjusted weighting values 133 of the language model (from the table 130). The weighting values 142 from the acoustic model and the adjusted weighting values 133 of the language model are combined as combined weighting values 144.

The terms with the highest weighting values from both the acoustic model and the language model are include in the table 140. From the acoustic model, the terms with the highest weighting values are the term 141a ("surging"), the term 141b ("surgery"), and the term 141c ("surcharge"). In the table 140, the terms 141a-141c are indicated as output of the acoustic model based on the acoustic model weighting values 142 assigned to those terms 141a-141c. As output from the acoustic model, the terms 141a-141c represent the best matches to the audio data 105, in other words, the terms that have the most similar sound to the audio data 105. Still, a term that matches the sounds encoded in the audio data 105 may not make logical sense or may not be grammatically correct in the speech sequence.

By combining information from the acoustic model with information from the language model, the speech recognition system 104 can identify a term that both (i) matches the sounds encoded in the audio data 105 and (ii) is appropriate in the overall speech sequence of a dictation. From the language model, the terms assigned the highest adjusted weighting values 133 are the term 141a ("surgery"), the term 141d ("bus"), and the term 121e ("visit"). The terms 141b, 141d, 141e are have the highest probability of occurring in the speech sequence based on, for example, grammar and other language rules and previous occurrences of the terms 141a, 141d, 141e. For example, the term 141b ("surgery") and the term 141d ("visit") previously occurred in a similar context to the context of the audio data 105, and as indicated by the adjusted weighting values 133, have a high probability of occurring in the speech sequence that includes the audio data 105.

For clarity, a very simple combination of the acoustic model weighting values and the adjusted language model weighting values is illustrated. The acoustic model weighting values 142 and the adjusted language model weighting values 133a-133e for each term 141a-141e are added together to determine the combined weighting values 143a-143e. Many other combinations are possible. For example, the acoustic model weighting values 142 can be normalized and the adjusted language model weighting values 133a-133e can be normalized to allow a more precise combination. In addition, the acoustic model weighting values 142 and the adjusted language model weighting values 133a-133e can be weighted differently or scaled when determining the combined weighting values 143a-143e. For example, the acoustic model weighting values 142 can influence the combined weighting values 143a-143e more than the language model weighting values 133a-133e, or vice versa.

The combined weighting values 143a-143e can indicate, for example, the relative probabilities that each of the corresponding terms 141a-141e is the correct transcription for the audio data 105. Because the combined weighting values 143a-143e include information from both the acoustic model and the language model, the combined weighting values 143a-143e indicate the probabilities that terms 141a-141e occur based on the degree that the terms 141a-141e match the audio data 105 and also the degree that the terms 141-141e match expected language usage in the sequence of terms.

The speech recognition system 104 selects the term with the highest combined weighting value 143 as the transcription for the audio data 105. In the example, the term 141b ("surgery") has a combined weighting value of "0.9," which is higher than the other combined weighting values 143a, 143c-143e. Based on the combined weighting values 143a-143e, the speech recognition system 104 selects the term "surgery" as the transcription for the audio data 105.

During state (F), the speech recognition system 104 transmits the transcription of the audio data 105 to the client device 102. The selected term 121a, "surgery," is transmitted to the client device 102 and added to the recognized words in the speech sequence 109. The user 101 is dictating an e-mail message in a web browser, as the context information 107 indicates, so the client device 102 will add the recognized term "surgery" to the email message being dictated. The speech recognition system 104 (or the content server system 106) can store the recognized term "surgery" (or the entire sequence 109) in association with the context information 107 so that the recently recognized term can be used to adjust a language model for future dictations, including a continuation of the speech sequence 109.

As the user 101 continues speaking, the states (A) through (F) can be repeated with new audio data and new context information. The language model can thus be adapted in real time to be fit the context of audio data accessed. For example, after speaking the words encoded in the audio data 105, the user 101 may change the active application on the client device 102 from a web browser to a word processor and continue speaking Based on the new context, new similarity scores and adjusted language model weightings can be determined and used to recognize speech that occurs in the new context. In some implementations, the language model can be continuously modified according to the audio data, context of the audio data, the terms accessed, and the contexts associated with the terms.

As described above, the system 100 can use text associated with a particular user 101 (e.g., e-mail messages written by the user 101 or text previously dictated by the user 101) to adapt a language model for the particular user 101. The system can also be used to adapt a language model for all users or for a particular set of users. For example, during state (B) the speech recognition system 104 can access terms and associated context information of a large set of users, rather than limit the terms and contexts accessed to those related to the user 101. The terms and context information can be used to alter the weighting values of a language model for multiple users.

Figure 2A:
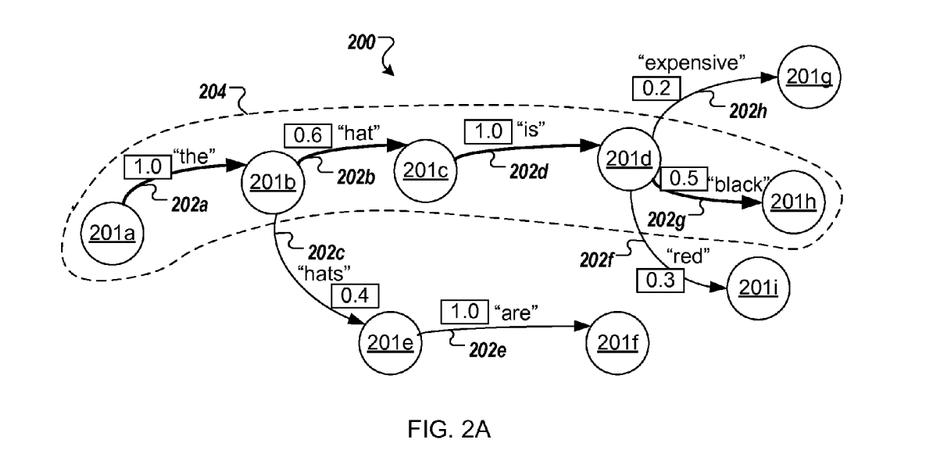
FIG. 2A is a diagram illustrating an example of a representation of a language model.

FIG. 2A is a diagram illustrating an example of a representation of a language model 200. In general, a speech recognition system receives audio data that includes speech and outputs one or more transcriptions that best match the audio data. The speech recognition system can simultaneously or sequentially perform multiple functions to recognize one or more terms from the audio data. For example, the speech recognition system can include an acoustic model and a language model 200. The language model 200 and acoustic model can be used together to select one or more transcriptions of the speech in the audio data.

The acoustic model can be used to identify terms that match a portion of audio data. For a particular portion of audio data, the acoustic model can output terms that match various aspects of the audio data and a weighting value or confidence score that indicates the degree that each term matches the audio data.

The language model 200 can include information about the relationships between terms in speech patterns. For example, the language model 200 can include information about sequences of terms that are commonly used and sequences that comply with grammar rules and other language conventions. The language model 200 can be used to indicate the probability of the occurrence of a term in a speech sequence based on one or more other terms in the sequence. For example, the language model 200 can identify which word has the highest probability of occurring at a particular part of a sequence of words based on the preceding words in the sequence.

The language model 200 includes a set of nodes 201a-201i and transitions 202a-202h between the nodes 201a-201i. Each node 201a-201i represents a decision point at which a single term (such as a word) is selected in a speech sequence. Each transition 202a-202h outward from a node 201a-201i is associated with a term that can be selected as a component of the sequence. Each transition 202a-202h is also associated with a weighting value that indicates, for example, the probability that the term associated with the transition 202a-202h occurs at that point in the sequence. The weighting values can be set based on the multiple previous terms in the sequence. For example, the transitions at each node and the weighting values for the transitions can be determined on the N terms that occur prior to the node in the speech sequence.

As an example, a first node 201a that represents a decision point at which the first term in a speech sequence is selected. The only transition from node 201a is transition 202a, which is associated with the term "the." Following the transition 202a signifies selecting the term "the" as the first term in the speech sequence, which leads to the next decision at node 201b.

At the node 201b there are two possible transitions: (1) the transition 202b, which is associated with the term "hat" and has a weighting value of 0.6; and (2) the transition 202c, which is associated with the term "hats" and has a weighting value of 0.4. The transition 202b has a higher weighting value than the transition 202c, indicating that the term "hat" is more likely to occur at this point of the speech sequence than the term "hats." By selecting the transition 202a-202h that has the highest weighting value at each node 201a-201i, a path 204 is created that indicates the most likely sequence of terms, in this example, "the hat is black."

The weighting values of transitions in the language model can be determined based on language patterns in a corpus of example text that demonstrates valid sequences of terms. One or more of the following techniques can be used. Machine learning techniques such as discriminative training can be used to set probabilities of transitions using Hidden Markov Models ("HMMs"). Weighted finite-state transducers can be used to manually specify and build the grammar model. N-gram smoothing can be used to count occurrences of n-grams in a corpus of example phrases and to derive transition probabilities from those counts. Expectation-maximization techniques, such as the Baum-Welch algorithm, can be used to set the probabilities in HMMs using the corpus of example text.

Figure 2B:
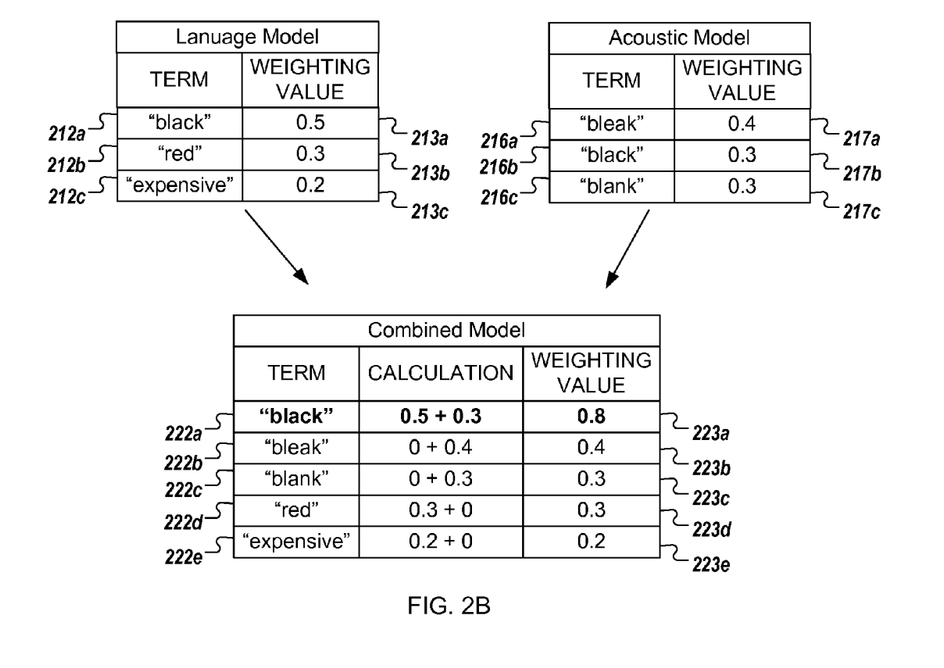
FIG. 2B is a diagram illustrating an example of a use of an acoustic model with the language model illustrated in FIG. 2A.

FIG. 2B is a diagram illustrating an example of a use of an acoustic model with the language model illustrated in FIG. 2A. The output of the language model can be combined with output of the acoustic model to select a transcription for audio data. For example, FIG. 2B illustrates the combination of the output from the acoustic model and the language model for the portion of audio data that corresponds to a single term. In particular, FIG. 2B illustrates the output for audio data that corresponds to the term selected by a transition 202f-202h from the node 201d in FIG. 2A. The language model outputs the terms 212a-212c and corresponding weighting values 213a-213c that are associated with the highest-weighted transitions from the node 201d. The acoustic model outputs the terms 216a-216c that best match the audio data, with corresponding weighting values 217a-217c that indicate the degree that the terms 216a-216c match the audio data.

The weighting values 213a-213c and 217a-217c are combined to generate combined weighting values 223a-223e, which are used to rank a combined set of terms 222a-222e. As illustrated, based on the output of the acoustic model and the language model, the term 222a "black" has the highest combined weighting value 223a and is thus the most likely transcription for the corresponding portion of audio data. Although the weighting values 213a-213c, 217a-217c output by the acoustic model and language model are shown to have equal influence in determining the combined weighting values 223a-223e, the weighting values 213a-213c, 217a-217c can also be combined unequally and can be combined with other types of data.

Figure 3:
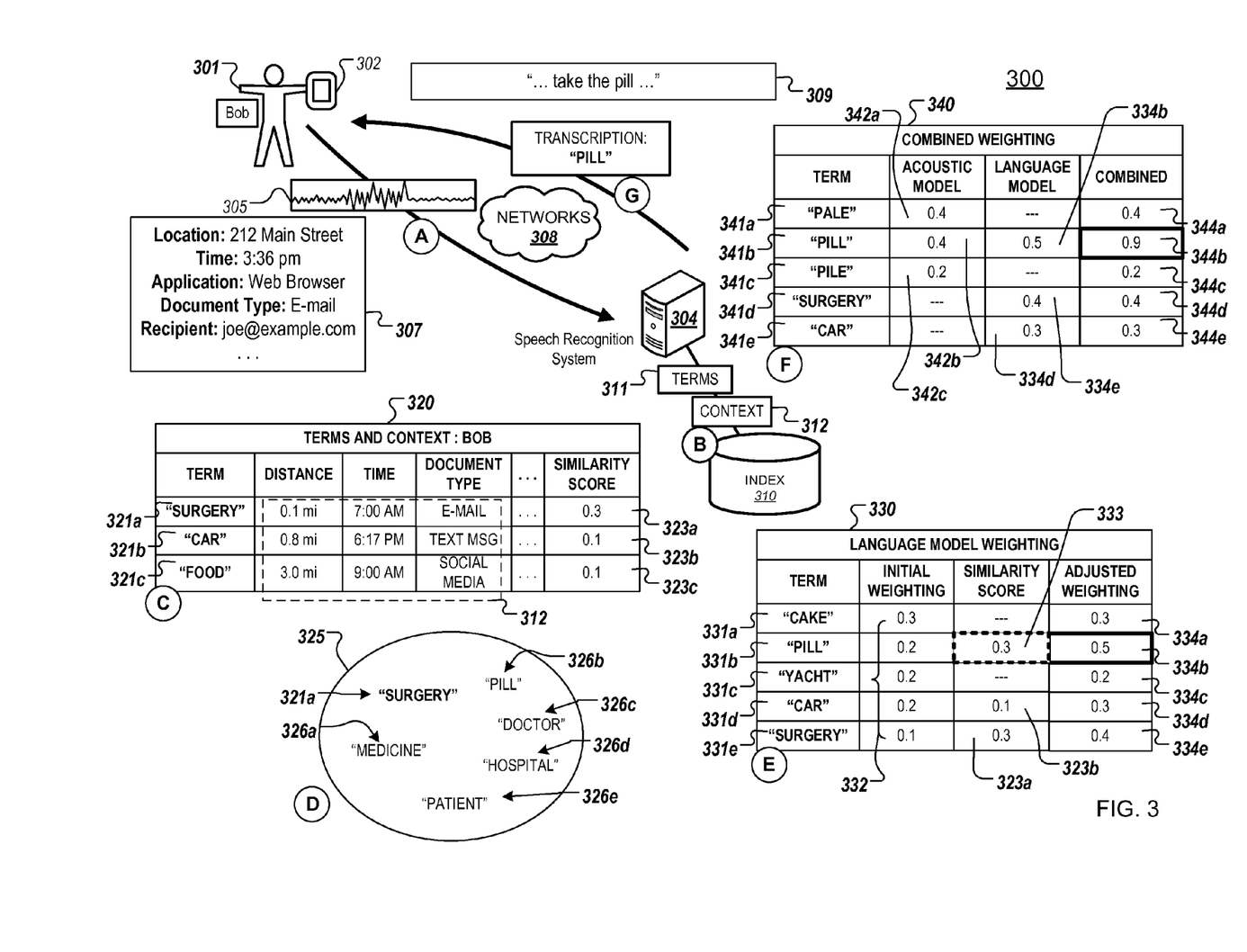

FIG. 3 is a diagram illustrating an example of a system 300 in which a language model is adjusted. The system 300 includes a client device 302, a speech recognition system 304n and an index 310 connected through one or more networks 308. FIG. 3 also illustrates a flow of data during states (A) to (G).

During state (A), a user 301 speaks and audio is recorded by the client device 302. For example the user may speak a speech sequence 309 including the words "take the pill." In the example, the terms "take the" in the speech sequence 309 have already been recognized by the speech recognition system 304. The client device encodes audio for the yet unrecognized term, "pill" as audio data 305. The client device 102 also determines context information 307 that describes the context of audio data 305, for example, the date and time the audio data was recorded, the geographical location in which the audio data was recorded, and the active application and active document type when the audio data was recorded. The client device 302 sends the audio data 305 and the context information 307 to the speech recognition system 304.

During state (B), the speech recognition system 304 accesses one or more terms 311 and associated context information 312. The speech recognition system 304 or another system can create an index 310 of the occurrence of various terms and the contexts in which the terms occur. The speech recognition system 304 can access the index 310 to identify terms 311 and access associated context information 312. As described above, the context information 312 can indicate aspects of context beyond context information included in a document. For example, the context information 312 can indicate the environment, conditions, and circumstances in which terms were entered. Accessed terms 311 can be terms 311 entered by typing, entered by dictation, or entered in other ways.

In some implementations, the speech recognition system 304 can access terms 311 that are known to be associated with the user 301. Alternatively, the speech recognition system 304 can access terms 311 that occur generally, for example, terms 311 that occur in documents associated with multiple users.

During state (C), the speech recognition system determines similarity scores 323a-323c that indicate the similarity between the context associated with the audio data 305 and the contexts associated with the accessed terms 311. For example, the table 320 illustrates terms 321a-321c accessed by the speech recognition system 304 and associated context information 312. The context information 312 includes a distance from the location indicated in the context information 307, a time the terms 321a-321c were entered, and a type of document in which the terms 321a-321c occur. Other aspects of the context of the terms can also be used, as described above.

The similarity scores 323a-323c can be determined in a similar manner as described above for state (C) of FIG. 1. For example, the similarity scores 323a-323c can be assigned to the terms 321a-321c so that higher similarity scores 323a-323c indicate a higher degree of similarity between the context in which the terms 321a-321c occur and the context in which the audio data 305 occurs.

For example, the term 321a ("surgery") occurs in an e-mail message, and the audio data 105 also is entered as a dictation for an e-mail message. The term 321a was entered at a location 0.1 miles from the location that the audio data 105 was entered. Because the document type of the term 321a and the distance from the location in the context information 307 is small, the term 321b can be assigned a similarity score 323a that indicates high similarity. By contrast, the term 321b occurs in a text message, not in an e-mail message like the audio data 105, and is more distant from the location in the context information 307 than was the term 321a. The similarity score 323b thus indicates lower similarity to the context described in the context information 307 than the similarity score 323a.

During state (D), the speech recognition system 304 identifies terms 326a-326e that are related to the terms 321a-321c. For example the speech recognition system 304 can identify a set 325 of terms that includes one or more of the terms 321a-321c.

The speech recognition system 304 can access sets of terms that are related to a particular category, topic, or subject. For example, one set of terms may relate to "airports," another set of terms may relate to "sports," and another set of terms may relate to "politics." The speech recognition system 304 can determine whether one of the terms 321a-321c is included in a set of terms. If a term 321a-321c is included in a set, the other words in the set can have a high probability of occurring because at least one term 321a-321c related to that topic or category has already occurred.

For example, one set 325 of terms can relate to "medicine." The set 325 can include the term 321a ("surgery") and other related terms 326a-326e in the topic or category of "medicine." The speech recognition system 304 can determine that the set 325 includes one of the terms 321a-321c, in this instance, that the set 325 includes the term 321a ("surgery"). The term 326b ("pill") and the term 326c ("doctor") are not included in the terms 321a-321c, which indicates that the user 301 may not have spoken or written those terms 326b, 326c previously. Nevertheless, because the user 301 has previously used in the term 321a ("surgery"), and because the term 321a is part of a set 325 of terms related to medicine, other terms 326a-326a in the set 325 are also likely to occur. Thus the prior occurrence of the term 321a ("surgery") indicates that the term 326b ("pill") and the 326c ("doctor") have a high probability of occurring in future speech as well.

During state (E), a language model is adjusted using the terms 326a-326e in the set 325. In general, a user that has previously written or dictated about a particular topic in one setting is likely to speak about the same topic again in a similar setting. For example, when a user 301 has previous dictated a term related to sports while at home, the user 301 is likely to dictate the other words related to sports in the future when at home.

In general, a language model can be adjusted as described above for state (D) of FIG. 1. By contrast to state (D) of FIG. 1, a language model can be adjusted using not only terms 121a-121c that have occurred, but also terms 326a-326e that may not have occurred previously but are related to a term 121a-121c that has occurred. Thus the probabilities in a language model can be set or altered for the terms 326a-326e based on the occurrence of a related term 121a that occurs in the same set 325 as the terms 326a-326e.

A table 330 illustrates terms 331a-331e that are indicated by a language model to be possible transcriptions for the audio data 105. Each of the terms 331a-331e is assigned a corresponding initial weighting value 332 that indicates a probability that each term 331a-331e will occur in the speech sequence 309 based other terms identified in the sequence 309. The table also includes a similarity score 323b of "0.1" for the term 331d ("car") and a similarity score 323a of "0.3" for the term 331e ("surgery").

The term 331b ("pill") was not included in the terms 321a-321c and thus was not assigned a similarity score during state (C). Because the term 331b ("pill") has been identified as being related to the term 331e ("surgery") (both terms are included in a common set 325), the term 331b is assigned a similarity score 333 based on the similarity score 323b of the term 331e ("surgery"). For example, term 331b ("pill") is assigned the similarity score 333 of "0.3" the same as the term 331e ("surgery"). Assigning the similarity score 333 to the term 331b ("pill") indicates that the term 331b ("pill"), like the term 331e ("surgery"), has an above-average likelihood of occurring in the context associated with the audio data 305, even though the term 331b ("pill") has not occurred previously in a similar context. A different similarity score 333 can also be determined. For example, a similarity score 333 that is lower than the similarity score 323a for the term 331e ("surgery") can be determined because the term 331b ("pill") did not occur previously in text associated with the user 301.

The speech recognition system 304 determines adjusted weighting values 334a-334e for the respective terms 331a-331e based on the similarity scores 323a, 323b, 333 that correspond to the terms 331e, 331d, 331b and the initial weighting values 332. The similarity scores 323a, 323b, 333 and initial weighting values 332 can be added, as illustrated, or can be scaled, weighted, or otherwise used to determine the adjusted weighting values 334a-334e.

During state (F), the speech recognition system 304 uses the adjusted language model to select a recognized word for the audio data 305. Similar to state (E) of FIG. 1, the speech recognition system 304 can combine the adjusted language model weighting values 334a-334e with acoustic model weighting values 342a-342c to determine combined weighting values 344a-344e, as shown in table 340. For example, for the term 341b ("pill"), the acoustic model weighting value 342b of "0.3" and the adjusted language model weighting value 334b of "0.3" can be combined to determine a combined weighting value 344b of "0.6". Because the combined weighting value 344b is greater than the other combined weighting values 344a, 344c-344e, the speech recognition system 304 selects the term 341b ("pill") as the transcription for the audio data 305.

During state (G), the speech recognition system 304 transmits the transcription of the audio data 305 to the client device 302. The client device 302 receives the transcription "pill" as the term in the sequence 309 that corresponds to the audio data 305.

Figure 4:
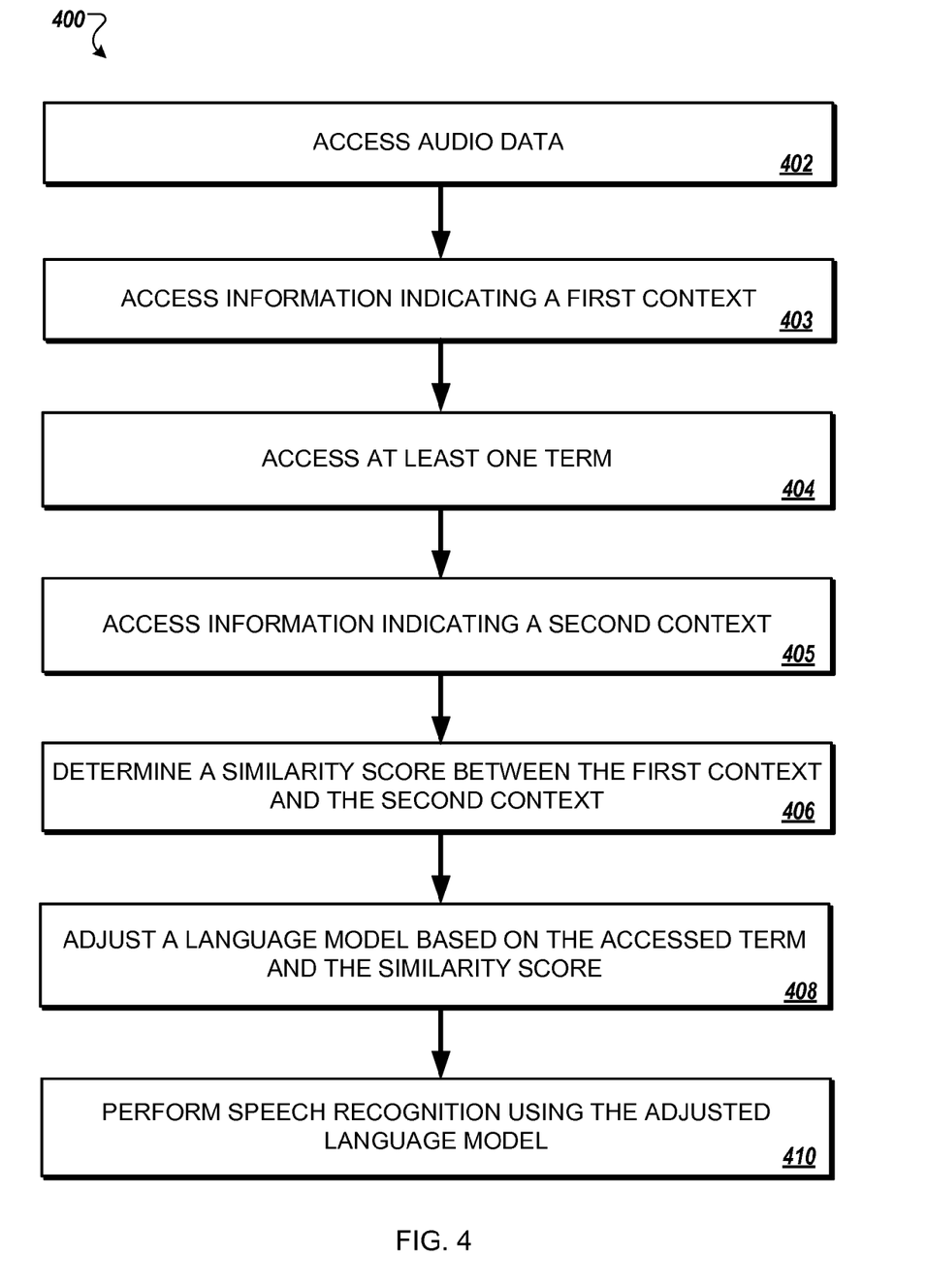
FIG. 4 is a flow diagram illustrating a process for adjusting a language model.

FIG. 4 is a flow diagram illustrating a process 400 for determining a language model. Briefly, the process 400 includes accessing audio data. Information that indicates a first context is accessed. At least one term is accessed. Information that indicates a second context is accessed. A similarity score that indicates a degree of similarity between the second context and the first context is determined. A language model is adjusted based on the accessed term and the determined similarity score to generate an adjusted language model. Speech recognition is performed on the audio data using the adjusted language model to select one or more candidate transcriptions for a portion of the audio data.

In particular, audio data is accessed (402). The audio data can include encoded speech of a user. For example, the audio data can include speech entered using a client device, and the client device can transmit the audio data to a server system.

Information that indicates a first context is accessed (403). The first context is associated with the audio data. For example, the information that indicates the first context can indicate the context in which the speech of a user occurred. The information that indicates the first context can describe the environment in which the audio data was received or recorded.

The first context can be the environment, circumstances, and conditions when the speech encoded in the audio data 105 was dictated. The first context can include a combination of aspects, such as time of day, day of the week, weekend or not weekend, month, year, location, and type of location (e.g., school, theater, store, home, work), how the data was entered (e.g., dictation). The first context can also include the physical state of a computing device receiving the speech, such as whether the computing device is held or not, whether the computing device is docked or undocked, the type of devices connected to the computing device, whether the computing device is stationary or in motion, and the speed of motion of the computing device. The first context can also include the operating state of the computing device, such as an application that is active, a particular application or type of application that is receiving the dictation, the type of document that is being dictated (e.g., e-mail message, text message, text document, etc.), a recipient of a message, and a domain of a recipient of a message.

The information that indicates the first context can indicate or describe one or more aspects of the first context. For example, the information can indicate a location, such as a location where the speech encoded in the audio data was spoken. The information that indicates the first context can indicate a document type or application type, such as a type of a document being dictated or an application that was active when speech encoded in the audio data was received by a computing device. The information that indicates the first context can include an identifier of a recipient of a message. For example, the information indicating the first context can include or indicate the recipient of a message being dictated.

At least one term is accessed (404). The term can be determined to have occurred in text associated with a particular user. The term can be determined to occur in text that was previously typed, dictated, received, or viewed by the user whose speech is encoded in the accessed audio data. The term can be determined to have been entered (including terms that were typed and terms that were dictated) by the user. The term can be a term that was recognized from a speech sequence, where the accessed audio data is a continuation of the speech sequence.

Information that indicates a second context is accessed (405). The second context is associated with the accessed term. The second context can be the environment, circumstances, and conditions present when the term was entered, whether by the user or by another person. The second context can include the same combination of aspects as described above for the first context. More generally, the second context can also be the environment in which the term is known to occur (e.g., in an e-mail message sent at a particular time), even if information about specifically how the term was entered is not available.

The information that indicates the second context can indicate one or more aspects of the second context. For example the information can indicate a location, such as a location associated with the occurrence of the accessed term. The information that indicates the second context can indicate a document type or application type, such as a type of a document in which the accessed term occurs or an application that was active when the accessed term was entered. The information that indicates the second context can include an identifier of a recipient or sender of a message. For example, the information that indicates the second context can include or indicate an identifier a recipient of a message that was previously sent.

A similarity score that indicates a degree of similarity between the second context and the first context is determined (406). The similarity score can be a binary or non-binary value.

A language model is adjusted based on the accessed term and the determined similarity score to generate an adjusted language model (408). The adjusted language model can indicate a probability of an occurrence of a term in a sequence of terms based on other terms in the sequence. The adjusted language model can include the accessed term and a weighting value assigned to the accessed term based on the similarity score.

A stored language model can be accessed, and the stored language model can be adjusted based on the similarity score. The accessed language model can be adjusted by increasing the probability that the accessed term will be selected as a candidate transcription for the audio data. The accessed language model can include an initial weighting value assigned to the accessed term. The initial weighting value can indicate the probability that the term will occur in a sequence of terms. The initial weighting value can be changed based on the similarity score, so that the adjusted language model assigns a weighting value to the term that is different from the initial weighting value. In the adjusted language model, the initial weighting value can be replaced with a new weighting value that is based on the similarity score.

Speech recognition is performed on the audio data using the adjusted language model to select one or more candidate transcriptions for a portion of the audio data (410).

The process 400 can include determining that the accessed term occurs in text associated with a user. The process 400 can include determining that the accessed term was previously entered by the user (e.g., dictated, typed, etc.). The audio data can be associated with the user (for example, the audio data can encode speech of the user), and a language model can be adapted to the user based on one or more terms associated with the user.

The process 400 can include identifying at least one second term related to the accessed term, the language model includes the second term, and determining the language model includes assigning a weighting value to the second term based on the similarity score. The related term can be a term that does not occur in association with the first context or the second context.

Figure 5:
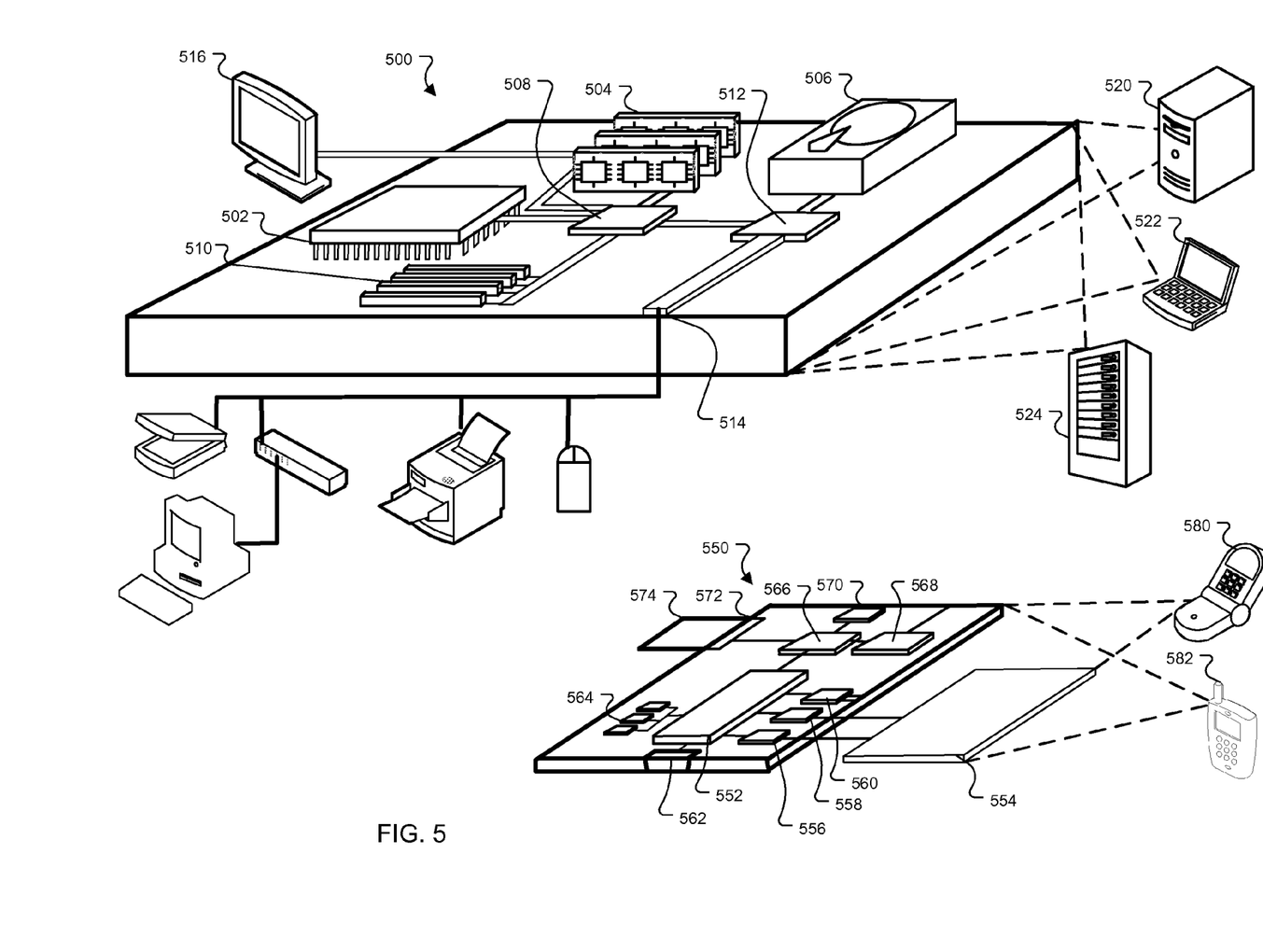
FIG. 5 is a block diagram of computing devices.

FIG. 5 is a block diagram of computing devices 500, 550 that may be used to implement the systems and methods described in this document, as either a client or as a server or plurality of servers. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smartphones, and other similar computing devices. The components shown here, their connections and relationships, and their functions, are meant to be exemplary only, and are not meant to limit implementations described and/or claimed in this document.

Computing device 500 includes a processor 502, memory 504, a storage device 506, a high-speed interface controller 508 connecting to memory 504 and high-speed expansion ports 510, and a low speed interface controller 512 connecting to a low-speed expansion port 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high-speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, or memory on processor 502.

Additionally computing device 500 or 550 can include Universal Serial Bus (USB) flash drives. The USB flash drives may store operating systems and other applications. The USB flash drives can include input/output components, such as a wireless transmitter or USB connector that may be inserted into a USB port of another computing device.

The high-speed interface controller 508 manages bandwidth-intensive operations for the computing device 500, while the low-speed interface controller 512 manages lower bandwidth-intensive operations. Such allocation of functions is exemplary only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port 514, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing devices 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive, solid state storage component, or other device, to provide additional storage. The components 552, 564, 554, 566, and 568 are interconnected using various buses, and several of the components may be mounted on a common motherboard or in other manners as appropriate.

The processor 552 can execute instructions within the computing device 550, including instructions stored in the memory 564. The processor may be implemented as a chipset of chips that include separate and multiple analog and digital processors. Additionally, the processor may be implemented using any of a number of architectures. For example, the processor 502 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT (Thin-Film-Transistor Liquid Crystal Display) display or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provide in communication with processor 552, so as to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In-line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provide as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552 that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS (Global Positioning System) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smartphone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made. For example, various forms of the flows shown above may be used, with steps re-ordered, added, or removed. Also, although several applications of providing incentives for media sharing and methods have been described, it should be recognized that numerous other applications are contemplated. Accordingly, other implementations are within the scope of the following claims.

What is claimed is:

1. A method comprising:
   obtaining audio data;
   accessing first context information associated with the audio data, wherein the first context information indicates (i) a first geographical location, and (ii) a first time;
   accessing second context information associated with one or more previously typed or previously transcribed terms, wherein the second context information indicates (i) a second geographical location and (ii) a second time;
   determining a similarity score for the first context information and the second context information based on (i) a degree of a similarity of the second geographical location to the first geographical location and (ii) a degree of a similarity of the second time to the first time;
   adjusting a language model based on the similarity score to adjust a likelihood that the language model indicates the one or more previously typed or previously transcribed terms as a candidate transcription of the audio data;
   determining a transcription of the audio data using the adjusted language model; and
   outputting the transcription that was determined using the adjusted language model.

2. The method of claim 1, wherein obtaining the audio data comprises receiving the audio data over a network from client device; and
   wherein outputting the transcription determined using the adjusted language model comprises providing the transcription to the client device over the network.

3. The method of claim 1, wherein accessing the first context information comprises accessing information that indicates a geographical location where the audio data was recorded and a time when the audio data was recorded.

4. The method of claim 1, wherein accessing the second context information comprises accessing second context information that is associated with one or more terms previously transcribed for other audio, the second context information indicating (i) a particular geographical location where the other audio was input, and (ii) a time when the other audio was input at the particular geographical location.

5. The method of claim 1, wherein obtaining the audio data comprises obtaining audio data for an utterance of a user;
   wherein accessing the first context information comprises accessing information that indicates a geographical location of a device when the audio data was recorded by the device and a time when the audio data was recorded by the device; and wherein accessing the second context information comprises accessing second context information associated with one or more previously transcribed terms that were previously transcribed from previously received audio data for a previous utterance of the user, the second context information indicating a geographical location of the device when the previous utterance of the user was input to the device and a time when the previous utterance of the user was input to the device.

6. The method of claim 1, wherein the first time indicates a first day of week when the audio data was recorded and the second time indicates a second day of week when the one or more previously typed or previously transcribed terms were input; and wherein determining the similarity score comprises determining the similarity score based on a similarity of the second day of week to the first day of week.

7. The method of claim 1, wherein the first time indicates a first time of day when the audio data was recorded and the second time indicates a second time of day when the one or more previously typed or previously transcribed terms were input; and wherein determining the similarity score comprises determining the similarity score based on a similarity of the second time of day to the first time of day.

8. The method of claim 1, wherein determining the similarity score comprises determining the similarity score based on a distance between the second geographical location and the first geographical location.

9. The method of claim 1, wherein accessing the first context information comprises accessing information that indicates a geographical location indicated by a Global Positioning System (GPS) receiver of a device that receives the audio data.

10. The method of claim 1, wherein adjusting the language model based on the similarity score comprises changing one or more weighting values in the language model that correspond to the one or more previously typed or previously transcribed terms.

11. The method of claim 10, wherein changing the one or more weighting values comprises changing the one or more weighting values such that a magnitude of the change in the one or more weighting values is based on the similarity score.

12. The method of claim 1, wherein adjusting the language model based on the similarity score comprises increasing the likelihood by an amount that is based on the similarity score.

13. A system comprising:
one or more processors; and
a non-transitory computer-readable medium coupled to the one or more processors having instructions stored thereon which, when executed by the one or more processors, cause the system to perform operations comprising:
obtaining audio data;
accessing first context information associated with the audio data, wherein the first context information indicates (i) a first geographical location, and (ii) a first time;
accessing second context information associated with one or more previously typed or previously transcribed terms, wherein the second context information indicates (i) a second geographical location and (ii) a second time;
determining a similarity score for the first context information and the second context information based on (i) a degree of a similarity of the second geographical location to the first geographical location and (ii) a degree of a similarity of the second time to the first time;
adjusting a language model based on the similarity score to adjust a likelihood that the language model indicates the one or more previously typed or previously transcribed terms as a candidate transcription of the audio data;
determining a transcription of the audio data using the adjusted language model; and
outputting the transcription that was determined using the adjusted language model.

14. The system of claim 13, wherein the first time indicates a first day of week when the audio data was recorded and the second time indicates a second day of week when the one or more previously typed or previously transcribed terms were input; and wherein determining the similarity score comprises determining the similarity score based on a similarity of the second day of week to the first day of week.

15. The system of claim 13, wherein the first time indicates a first time of day when the audio data was recorded and the second time indicates a second time of day when the one or more previously typed or previously transcribed terms were input; and wherein determining the similarity score comprises determining the similarity score based on a similarity of the second time of day to the first time of day.

16. The system of claim 13, wherein determining the similarity score comprises determining the similarity score based on a distance between the second geographical location and the first geographical location.

17. A non-transitory computer storage medium storing a computer program, the program comprising instructions that when executed by one or more computers cause the one or more computers to perform operations comprising:
obtaining audio data;
accessing first context information associated with the audio data, wherein the first context information that indicates (i) a first geographical location, and a first time;
accessing second context information associated with one or more previously typed or previously transcribed terms, wherein the second context information indicates (i) a second geographical location and (ii) a second time;
determining a similarity score for the first context information and the second context information based on (i) a degree of a similarity of the second geographical location to the first geographical location and (ii) a degree of a similarity of the second time to the first time;
adjusting a language model based on the similarity score to adjust a likelihood that the language model indicates the one or more previously typed or previously transcribed terms as a candidate transcription of the audio data;
determining a transcription of the audio data using the adjusted language model; and
outputting the transcription that was determined using the adjusted language model.

18. The non-transitory computer storage medium of claim 17, wherein the first time indicates a first day of week when the audio data was recorded and the second time indicates a second day of week when the one or more previously typed or previously transcribed terms were input; and wherein determining the similarity score comprises determining the similarity score based on a similarity of the second day of week to the first day of week.

19. The non-transitory computer storage medium of claim 17, wherein the first time indicates a first time of day when the audio data was recorded and the second time indicates a second time of day when the one or more previously typed or previously transcribed terms were input; and wherein determining the similarity score comprises determining the similarity score based on a similarity of the second time of day to the first time of day.

20. The non-transitory computer storage medium of claim 17, wherein determining the similarity score comprises determining the similarity score based on a distance between the second geographical location and the first geographical location.

21. The method of claim 1, wherein obtaining the audio data comprises obtaining audio data for an utterance of a user; and wherein accessing the second context information comprises accessing second context information associated with one or more terms that were previously typed by the user, the second context information indicating (i) a particular geographical location where the user typed the one or more terms, and (ii) a time when the user typed the one or more terms while at the particular geographical location.

* * * * *